United States Patent
Li et al.

(10) Patent No.: US 9,982,656 B2
(45) Date of Patent: May 29, 2018

(54) METHOD, DEVICE, AND SYSTEM FOR CONTROLLING WIND ALIGNMENT CORRECTION OF WIND TURBINE GENERATOR SYSTEM

(71) Applicant: BEIJING GOLDWIND SCIENCE & CREATION WINDPOWER EQUIPMENT CO., LTD., Beijing (CN)

(72) Inventors: Jian Li, Beijing (CN); Guilin Zhou, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 0 days. days.

(21) Appl. No.: 15/528,666

(22) PCT Filed: Nov. 24, 2015

(86) PCT No.: PCT/CN2015/095450
§ 371 (c)(1),
(2) Date: May 22, 2017

(87) PCT Pub. No.: WO2016/086778
PCT Pub. Date: Jun. 9, 2016

(65) Prior Publication Data
US 2017/0268484 A1  Sep. 21, 2017

(30) Foreign Application Priority Data
Dec. 5, 2014  (CN) .......................... 2014 1 0741958

(51) Int. Cl.
G01C 17/38  (2006.01)
F03D 7/02  (2006.01)
(Continued)

(52) U.S. Cl.
CPC ............ *F03D 7/0204* (2013.01); *G01B 21/22* (2013.01); *F05B 2270/32* (2013.01); *F05B 2270/329* (2013.01); *F05B 2270/335* (2013.01)

(58) Field of Classification Search
CPC ...................................................... F03D 7/0204
See application file for complete search history.

(56) References Cited

U.S. PATENT DOCUMENTS

2012/0279288 A1* 11/2012 Frederiksen .......... F03D 7/0204
73/112.01
2014/0241878 A1    8/2014 Herrig et al.

FOREIGN PATENT DOCUMENTS

CN    101806282    *   8/2010
CN    101806282 A       8/2010
(Continued)

OTHER PUBLICATIONS

International Search Report dated Feb. 25, 2016; PCT/CN2015/095450.
(Continued)

*Primary Examiner* — Phuong Huynh
(74) *Attorney, Agent, or Firm* — Ladas & Parry LLP; Loren K. Thompson (57) ABSTRACT

A method for controlling wind alignment correction of a wind turbine comprises: acquiring environmental wind speed values, wind alignment angle measured values, and generated power values of the wind turbine in real time; dividing each acquired environmental wind speed value into multiple wind speed sections according to the magnitude of the environmental wind speed value, and extracting wind alignment angle measured values and generated power values in at least one wind speed section; determining a maximum value of extracted generated power values in each wind speed section; calculating a wind alignment correction deviation of the wind turbine according to a wind alignment (Continued)

angle measured value corresponding to the maximum value; and performing correction processing on a subsequently acquired wind alignment angle measured value by using the wind alignment correction deviation.

17 Claims, 8 Drawing Sheets

(51) Int. Cl.
    *G01B 21/22*     (2006.01)
    *G06F 11/30*     (2006.01)

(56) References Cited

FOREIGN PATENT DOCUMENTS

| CN | 102213182 A | 10/2011 |
|----|-------------|---------|
| CN | 102777319 A | 11/2012 |
| CN | 104481604 A | 4/2015 |
| EP | 2749766 A1 | 7/2014 |

OTHER PUBLICATIONS

Written Opinion of the International Searching Authority dated Feb. 25, 2016; PCT/CN2015/095450.

\* cited by examiner

METHOD, DEVICE, AND SYSTEM FOR CONTROLLING WIND ALIGNMENT CORRECTION OF WIND TURBINE GENERATOR SYSTEM

This application is a national phase of International Application No. PCTICN2016/095450, titled "METHOD, DEVICE. AND SYSTEM FOR CONTROLLING WIND ALIGNMENT CORRECTION OF WIND TURBINE GENERATOR SYSTEM", filed on Nov. 24, 2015 which claims priority to Chinese Patent Application No. 201410741958.6 titled "METHOD, DEVICE, AND SYSTEM FOR CONTROLLING WIND ALIGNMENT CORRECTION OF WIND TURBINE GENERATOR SYSTEM " and filed with the Chinese State Intellectual Property Office on Dec. 5 2014, both of which are incorporated herein by reference in their entirety.

FIELD

The present disclosure relates to the technical field of wind power, and in particular to a method, device and system for controlling wind alignment correction of a wind turbine.

BACKGROUND

Due to an initial installation error, aging or screw loosening after operation for a long period and an impeller wake flow of a wind turbine (referred to as "WT" for short), there is an error between a wind alignment angle acquired actually by a yawing system of the wind turbine and a true value, thereby resulting in that a wind alignment angle deviation calculated by the yawing system is not accurate. The inaccurate wind alignment angle deviation results in loss of generating capacity and increasing of unbalanced loads for the wind turbine. Therefore, it is significant to monitor and correct the wind alignment angle of the wind turbine conveniently and effectively.

In the conventional technology, yawing correction is performed by monitoring a yawing angle outputted by a wind turbine to be monitored, that is, an alarm is triggered to prompt the engineers and technicians to check a wind measuring apparatus when the wind alignment angle exceeds an average wind alignment angle threshold of wind turbines in a whole wind farm and a wind alignment angle standard deviation exceeds a wind alignment angle standard deviation threshold of the wind turbines in the whole wind farm. The method has the following disadvantages: the standard deviation and the average wind alignment angle of the wind turbines in the whole wind farm are rough for each independent wind turbine; the alarm is triggered in response to a specific threshold and real-time correction can not be implemented, thus requirements of security and performances of the wind turbine can not be met; and there is an error in the operation of the engineers and technicians to a certain degree.

SUMMARY

According to embodiments of the present disclosure, a method, device and system for controlling wind alignment correction of a wind turbine are provided, to perform wind alignment correction on a wind turbine in operation, thereby improving efficiency of yawing correction for the wind turbine.

In order to achieve the above object, according to an embodiment of the present disclosure, a method for controlling wind alignment correction of a wind turbine is provided, which includes:
  acquiring environmental wind speed values, wind alignment angle measurement values and generation power values of the wind turbine in a real-time manner;
  grouping the acquired environmental wind speed values into multiple wind speed sections based on magnitudes of the environmental wind speed values, and extracting the wind alignment angle measurement values and the generation power values for at least one of the multiple wind speed sections;
  determining local maximum values of the generation power values extracted for the respective wind speed sections;
  calculating a wind alignment correction deviation of the wind turbine based on the wind alignment angle measurement values extracted for the respective wind speed sections and corresponding to the determined local maximum values of the generation power values; and
  correcting the wind alignment angle measurement values to be acquired subsequently by using the wind alignment correction deviation.

According to an embodiment of the present disclosure, a device for controlling wind alignment correction of a wind turbine is provided, which includes:
  an acquiring module configured to acquire environmental wind speed values, wind alignment angle measurement values and generation power values of the wind turbine in a real-time manner;
  an extracting module configured to group the acquired environmental wind speed values into multiple wind speed sections based on magnitudes of the environmental wind speed values and extract the wind alignment angle measurement values and the generation power values for at least one of the multiple wind speed sections;
  a determining module configured to determine local maximum values of the generation power values extracted for the respective wind speed sections;
  a calculating module configured to calculate a wind alignment correction deviation of the wind turbine based on the wind alignment angle measurement values extracted for the respective wind speed sections and corresponding to the determined local maximum values of the generation power values; and
  a correcting module configured to correct the wind alignment angle measurement values to be acquired subsequently by using the wind alignment correction deviation.

According to an embodiment of the present disclosure, a system for controlling wind alignment correction of wind turbines is provided, which includes a cluster controller and stand-alone controllers provided on the wind turbines, where
  each of the stand-alone controllers is configured to monitor environmental wind speed values, wind alignment angle measurement values and generation power values of the wind turbine where the stand-alone controller is located; and
  the cluster controller includes:
  a cluster acquiring module configured to acquire environmental wind speed values, wind alignment angle measurement values and generation power values of the wind turbine from the stand-alone controllers;
  a cluster extracting module configured to group the acquired environmental wind speed value of each of the wind turbines into multiple wind speed sections based on magnitudes of the environmental wind speed values, and extract the yawing alignment angle measurement values and the generation power values for at least one of the multiple wind speed sections;

a cluster determining module configured to determine local maximum values of the generation power values extracted for the respective wind speed sections of each wind turbine;

a cluster calculating module configured to calculate a wind alignment correction deviation of each wind turbine based on the wind alignment angle measurement values extracted for the respective wind speed sections of the wind turbine and corresponding to the determined local maximum values of the generation power values; and a cluster correcting module configured to instruct the stand-alone controllers to correct the wind alignment angle measurement values to be monitored subsequently by using the wind alignment correction deviations.

With the method, device and system for controlling wind alignment correction of the wind turbine according to the embodiments of the present disclosure, the environmental wind speed values, the wind alignment angle measurement values and the generation power values of the wind turbine are acquired in a real-time manner; a wind alignment correction deviation of the wind turbine is calculated based on wind alignment angle measurement values corresponding to the local maximum values of the generation power values for the respective wind speed sections; and the wind alignment angle measurement values to be acquired subsequently are corrected by using the wind alignment correction deviation, thereby controlling wind alignment correction of the wind turbine and improving correction efficiency.

DETAILED DESCRIPTION OF EMBODIMENTS

Figure 1:
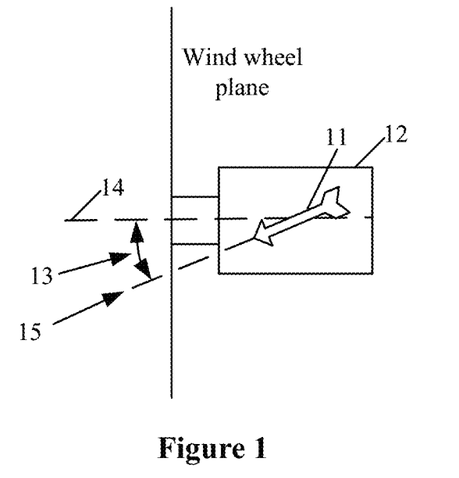
FIG. 1 is a schematic diagram of a method for measuring a wind alignment angle of a wind turbine in a wind turbine according to the conventional technology.

FIG. 1 is a schematic diagram showing a method for measuring a wind alignment angle of a wind turbine in a wind turbine according to the conventional technology. As shown in FIG. 1, generally a wind measuring apparatus 11 (such as a vane) is mounted on a cabin 12 and is configured to measure a wind alignment angle 13 of the wind turbine, i.e., an angle between a central line 14 of the cabin and a coming wind direction 15.

Figure 2:
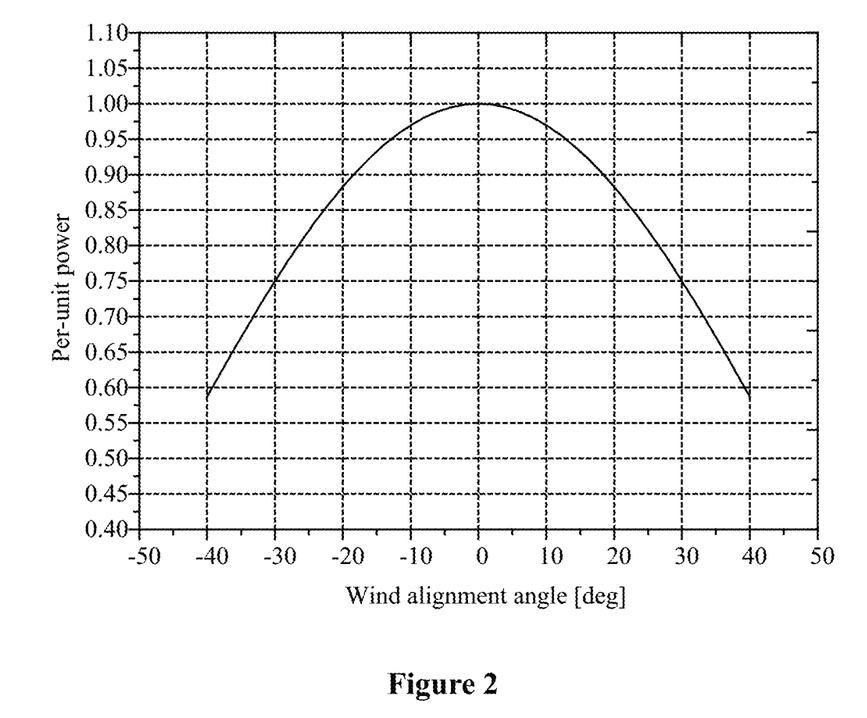
FIG. 2 is a schematic graph showing a relationship between wind alignment angles and generation powers measured by a wind turbine when a wind measuring apparatus has no deviation.
Figure 3:
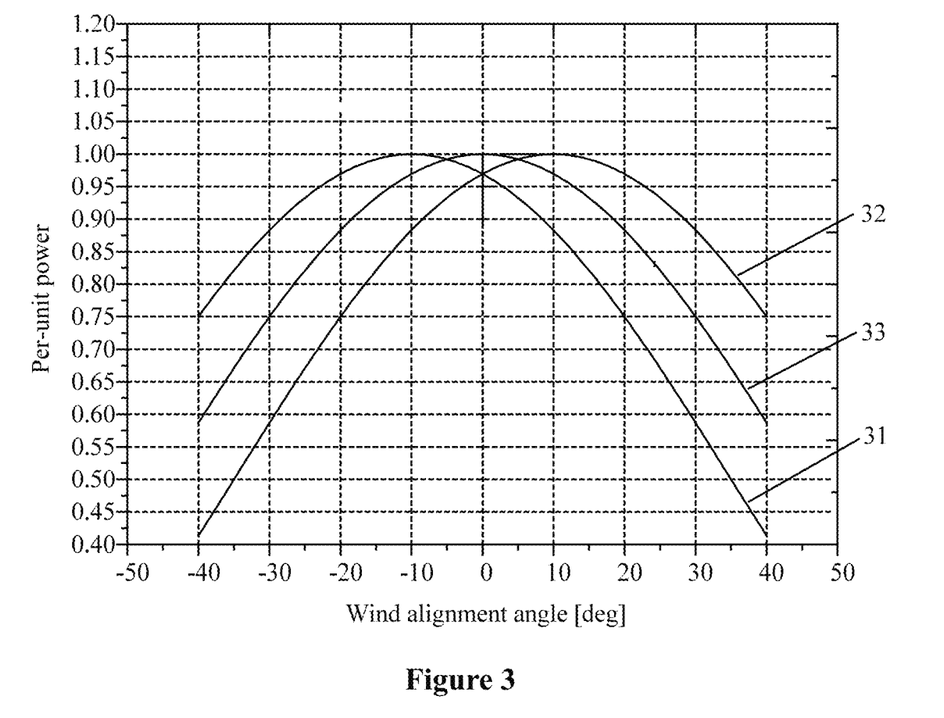
FIG. 3 is a schematic graph showing a relationship between wind alignment angles and generation powers measured by a wind turbine when a wind measuring apparatus has a deviation.

FIG. 2 a schematic graph showing a relationship between wind alignment angles and generation powers (the generation powers mentioned herein are indicated by "a per-unit power") of a wind turbine when a wind measuring apparatus has no deviation. As shown in FIG. 2, in an ideal conditions, generation powers of the wind turbine should theoretically be distributed in an axially symmetric manner on a straight line corresponding to the wind alignment angle of 0 degree and a local maximum value of the generation powers corresponds to 0 degree in the same environmental wind speed section (it is considered by default that differences of influence on the wind turbine due to differences between different environmental wind speeds may be ignored for the same environmental wind speed section). When the wind measuring apparatus of the wind turbine has a measuring deviation, a curve 31 or a curve 32 occurs in FIG. 3 which is a schematic graph showing a relationship between the wind alignment angles and the generation powers. The curve 31 and the curve 32 respectively show cases of deviations of corresponding generation powers when the wind measuring apparatus deviates toward a negative angle direction and a positive angle direction relative to a normal wind alignment angle. A curve 33 shows a relationship between wind alignment angles and generation powers when the wind measuring apparatus has no deviation.

According to embodiments of the present disclosure, the relationship between actually measured wind alignment angles and generation powers is compared with the theoretical curve relationship in a case of no wind alignment angle deviation, thereby calculating a wind alignment correction deviation of a wind turbine; and wind alignment angle measurement values to be acquired subsequently are corrected by using the wind alignment correction deviation, thereby controlling the wind alignment correction of the wind turbine. The technical solutions of the embodiments of the present disclosure may adapt to various types of wind turbines.

First Embodiment

Figure 4:
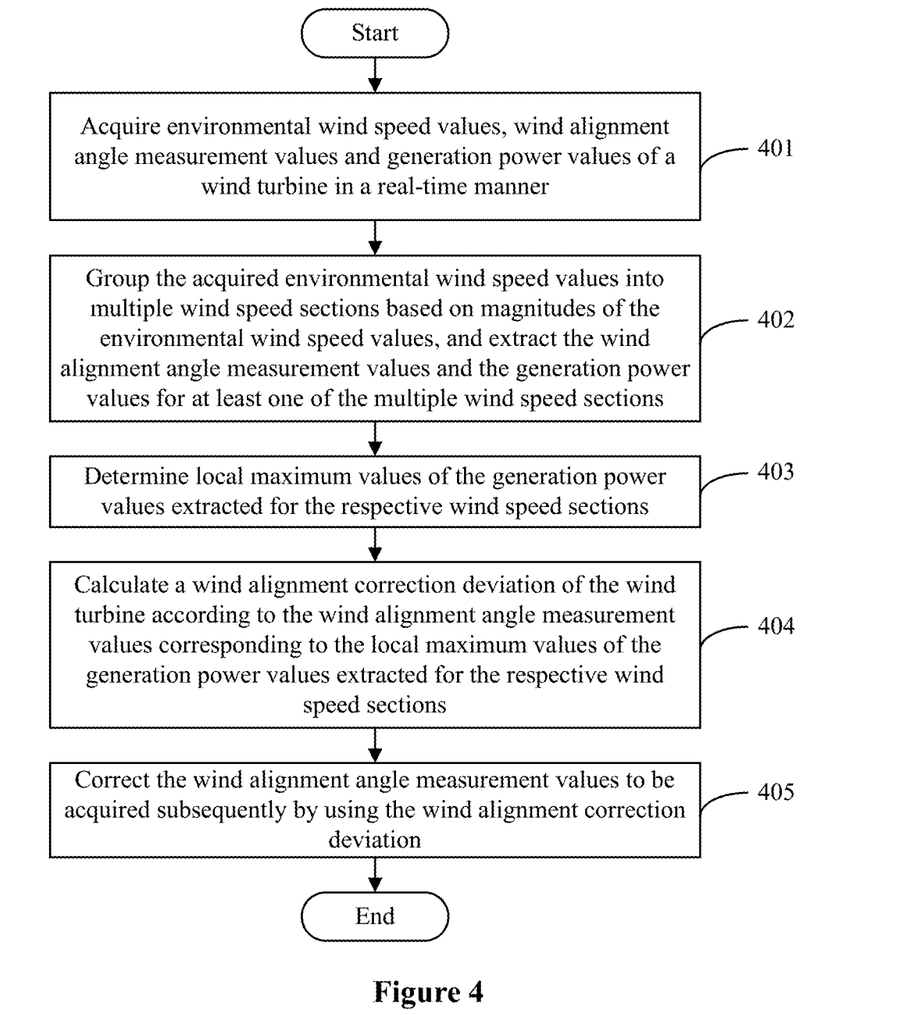
FIG. 4 is a flowchart of a method for controlling wind alignment correction of a wind turbine according to an embodiment of the present disclosure.

FIG. 4 is a flowchart of a method for controlling wind alignment correction of a wind turbine according to an embodiment of the present disclosure. The method may be performed by a yawing control system in the wind turbine or a control device or module integrated in the system. As shown in FIG. 4, the method for controlling wind alignment correction of the wind turbine includes the following steps.

In step S401, environmental wind speed values, wind alignment angle measurement values and generation power values of the wind turbine are acquired in a real-time manner.

The environmental wind speed value is the magnitude of the wind speed in the environment where the wind turbine is located. The wind alignment angle measurement value is the wind alignment angle measured actually by a wind measuring apparatus of the wind turbine. The generation power value is the per-unit power output value when the wind turbine generates power. The three parameters each are acquired in a real-time manner when the wind turbine operates, and a one-to-one correspondence exists between the three parameters.

In step 402, the acquired environmental wind speed values are grouped into multiple wind speed sections based on the magnitudes of the environmental wind speed values, and wind alignment angle measurement values and generation power values are extracted for at least one of the multiple wind speed sections.

Generally, the generation power values of the wind turbine change with different environmental wind speeds and wind alignment angles. Theoretically, in order to obtain information about the change of the generation power values with the wind alignment angles, it needs to extract wind alignment angle measurement values and generation power values at the same environmental wind speed. However, an unavoidable measurement error may be introduced in an actual measurement. Therefore, in the embodiment, the acquired environmental wind speed values are grouped into multiple wind speed sections based on the magnitudes of the environmental wind speed values, and environment wind speed values included in each wind speed section are respectively approximated as the same environmental wind speed. It should be understood that, the smaller the difference between the environmental wind speed values in each wind speed section is, the more accurate the obtained information about the change of the generation power values of the wind turbine with the wind alignment angles in the wind speed section is, and the less interference due to the difference between the environmental wind speed values is.

After the acquired environmental wind speed values are grouped into multiple wind speed sections based on the magnitudes of the environmental wind speed values, wind alignment angle measurement values and generation power values may be extracted for at least one wind speed section to perform subsequent steps.

In step S403, local maximum values of the generation power values extracted for the respective wind speed sections are determined.

It may be known from FIG. 2 that, when the environmental wind speed is fixed, the local maximum value of the generation power values of the wind turbine theoretically corresponds to a case where the wind turbine directly faces a coming wind, i.e., the wind alignment angle is 0 degree. Therefore, after determining the local maximum values of the generation power values for respective wind speed sections, it can be known whether there is a deviation of the wind alignment angle measured by the wind turbine in the wind speed section.

The local maximum values of the generation power values for respective wind speed sections may be determined by the following manners. A maximum value of the generation power values for a wind speed section may be directly determined as a local maximum value. Alternatively, data fitting may be performed on the generation power values and the wind alignment angle measurement values, and a local maximum value may be determined by a data image processing method. The method for determining the local maximum values of the generation power values is not limited in the embodiment.

In step S404, a wind alignment correction deviation of the wind turbine is calculated based on wind alignment angle measurement values corresponding to the local maximum values of the generation power values extracted for the respective wind speed sections.

It can be known whether there is a measurement error for a current wind measuring apparatus according to a deviation between the wind alignment angle measurement values corresponding to the local maximum values of the generation power values for the respective wind speed sections and a theoretical value in ideal conditions, i.e., 0 degree. Based on the direction and the magnitude of the deviation, a wind alignment correction deviation for correcting the wind alignment angle measurement values of the wind turbine may be calculated. For example, a deviation value occurring most frequently in the deviations between the wind alignment angle measurement values corresponding to the local maximum values of the generation power values for the respective wind speed sections and the theoretical value in ideal conditions, i.e., 0 degree, is used as the wind alignment correction deviation of the wind turbine. Alternatively, a weighted average of the deviation values corresponding to the respective wind speed sections is used as the wind alignment correction deviation. In the embodiment, the method for calculating the wind alignment correction deviation of the wind turbine based on the wind alignment angle measurement values corresponding to the local maximum values of the generation power values extracted for the respective wind speed sections is not limited.

In step S405, wind alignment angle measurement values to be acquired subsequently are corrected by using the wind alignment correction deviation.

For example, if the calculated wind alignment correction deviation indicates that the current wind alignment angle measurement value is greater than the theoretical value, correction for reducing the wind alignment angle is performed on the wind alignment angle measurement values to be acquired subsequently; otherwise, correction for increasing the wind alignment angle is performed. An adjustment amount of the angle may be set based on the magnitude of the obtained wind alignment correction deviation value.

The correction processing described above may include: correcting the wind alignment angle measurement values by adding a correction compensation amount in a master control program of the wind turbine; or correcting the wind alignment angle measurement values by correcting the wind measuring apparatus by using a tooling device.

With the method for controlling the wind alignment correction of the wind turbine according to the embodiment of the present disclosure, the wind alignment correction of the wind turbine in operation is controlled in a real-time manner as needed by performing steps 401 to 405 above, thereby improving correction efficiency.

Second Embodiment

Figure 5A:
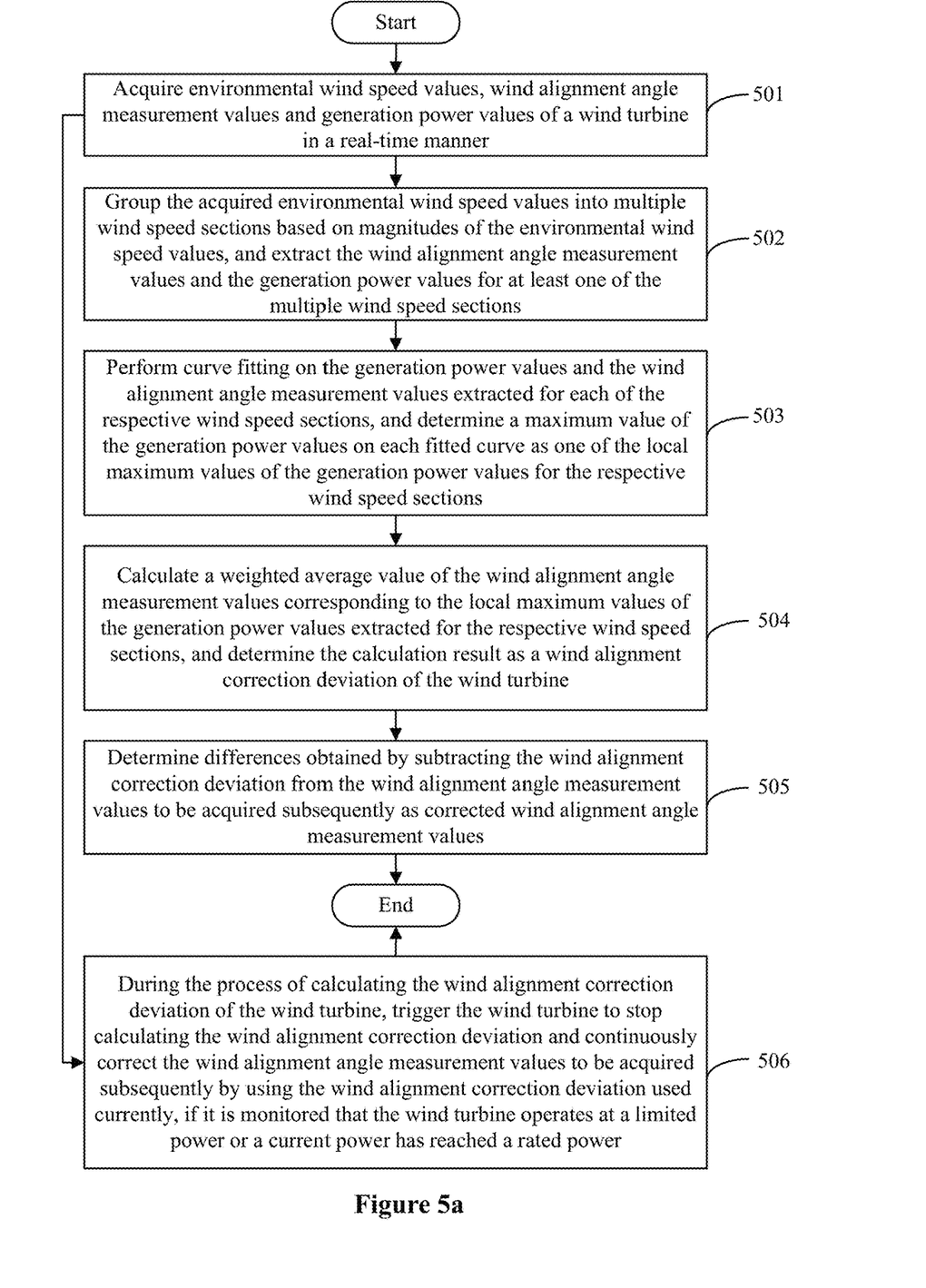
FIG. 5a is a flowchart of a method for controlling wind alignment correction of a wind turbine according to another embodiment of the present disclosure.

FIG. 5a is a flowchart of a method for controlling wind alignment correction of a wind turbine according to another embodiment of the present disclosure, which is a specific implementation of the embodiment shown in FIG. 4. As shown in FIG. 5a, the method for controlling the wind alignment correction of the wind turbine includes the following steps.

In step S501, environmental wind speed values, wind alignment angle measurement values and generation power values of the wind turbine are acquired in a real-time manner.

In step S502, the acquired environmental wind speed values are grouped into multiple wind speed sections based on the magnitudes of the environmental wind speed values, and the wind alignment angle measurement values and the generation power values are extracted for at least one of the multiple wind speed sections.

For the processes of performing the above steps 501 to 502, one may refer to corresponding contents of the above steps 401 to 402, which are not described in detail here in the embodiment.

In step S503, curve fitting may be performed on the generation power values and the wind alignment angle measurement values extracted for each of the respective wind speed sections, and a maximum value of the generation power values on each fitted curve is determined as one of the local maximum values of the generation power values for the respective wind speed sections. The step may be regarded as implementation of the above step 503.

In the embodiment, a curve is fitted according to the generation power values and the wind alignment angle measurement values for each of the respective wind speed sections by a curve fitting method in a two dimensional coordinate system, and a maximum value of the generation power values on each curve is determined as one of the local maximum values of the generation power values for the respective wind speed sections. The local maximum values of the generation power values is determined by adopting the curve fitting method, not only a overall trend that the generation power values change with the wind alignment angle measurement values can be obtained, but also interference on determining the local maximum values due to a specific ambiguous point can be avoided.

In step S504, a weighed average value of wind alignment angle measurement values corresponding to the local maximum values of the generation power values extracted for the respective wind speed sections is calculated, and the calculation result is determined as a wind alignment correction deviation of the wind turbine. The step may be regarded as implementation of step 404.

In a case that extraction is performed for only one wind speed section, a wind alignment angle measurement value corresponding to a local maximum value of generation power values for the wind speed section may be determined as a wind alignment correction deviation. In a case that extraction is performed for multiple wind speed sections, a weight may be set for each of the multiple wind speed sections; then a weighed average of products of the wind alignment angle measurement values corresponding to the local maximum values of the generation power values for the respective wind speed sections and corresponding weights is calculated, and the obtained average value is determined as the wind alignment correction deviation.

In step S505, differences obtained by subtracting the wind alignment correction deviation from wind alignment angle measurement values to be acquired subsequently are determined as corrected wind alignment angle measurement values. The step may be regarded as implementation of step 405.

During an actual operation process of the wind turbine, the wind turbine may operate at a limited power or a current generation power has reached a rated power. For these cases, it is not suitable to further increase the generation power, that is, it is not suitable to further correct the current wind alignment angle measurement value based on the newly calculated wind alignment correction deviation. Therefore, during the process of performing the above method, step 506 may be further included.

In step S506, during the process of calculating a wind alignment correction deviation of the wind turbine, the wind turbine is triggered to stop calculating the wind alignment correction deviation and continuously correct wind alignment angle measurement values to be acquired subsequently by using the wind alignment correction deviation used currently, if it is monitored that the wind turbine operates at a limited power currently or a current power has reached a rated power.

In the embodiment of the present disclosure, after the environmental wind speed values, the wind alignment angle measurement values and the generation power values of the wind turbine are acquired in a real-time manner, the wind alignment correction deviation value may be obtained in a real-time manner by the above steps. Alternatively, a next wind alignment correction deviation value is calculated according to the above data obtained until a current time instant every once in a while, and wind alignment angle measurement values acquired after a certain time instant are corrected according to a wind alignment correction deviation value calculated for the certain time instant. If a new wind alignment correction deviation value is to be calculated at a certain time instant, a current operation state of the wind turbine may be determined. If it is monitored that the wind turbine operates at a limited power or a current power has reached a rated power, the wind turbine is triggered to stop calculating the wind alignment correction deviation and continuously correct wind alignment angle measurement values to be acquired subsequently by using the wind alignment correction deviation used currently, until a wind alignment angle deviation of the wind turbine is calculated by the wind turbine based on the monitored environmental wind speed values, wind alignment angle measurement values and generation power values next time, to perform determination and correction operations as described above on wind alignment angle measurement values to be acquired subsequently by using the newly calculated wind alignment angle deviation. The above processes circulate.

In this way, the current operation state of the wind turbine is monitored, thereby avoiding calculating the wind alignment correction deviation repetitively when it is not necessary to further correct the wind alignment angle measurement values of the wind turbine.

Figure 5B:
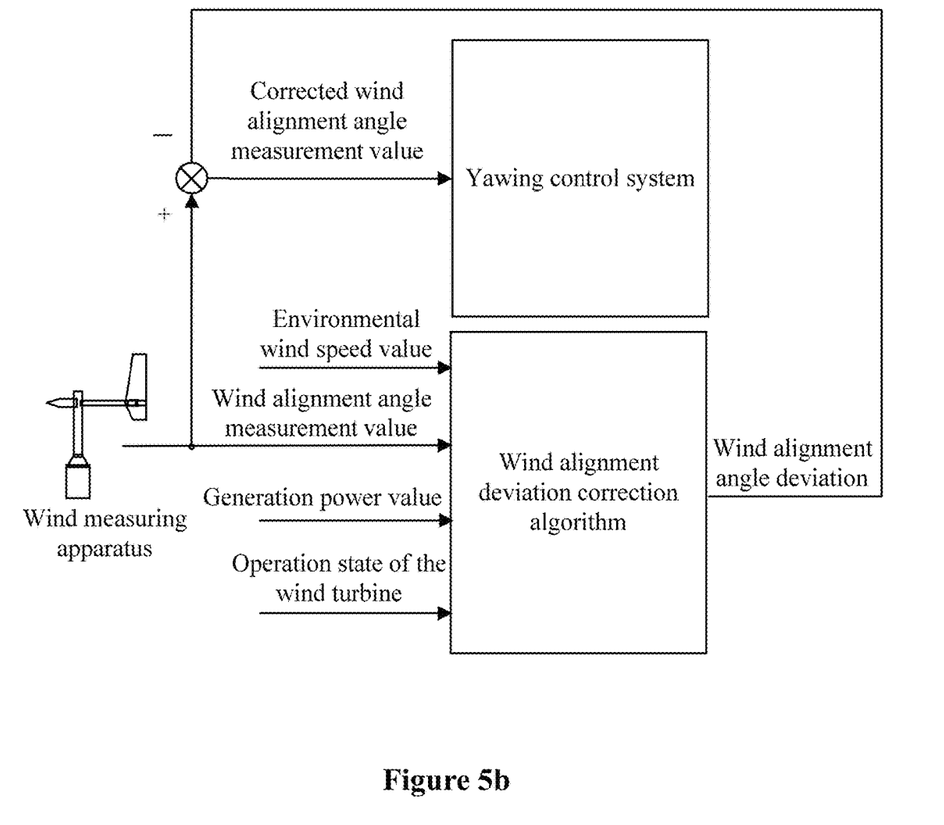
FIG. 5b is a schematic diagram of a method for controlling wind alignment correction of a wind turbine according to the present disclosure.

FIG. 5b is a schematic diagram of a method for controlling wind alignment correction of a wind turbine according to the present disclosure. The method schematic diagram corresponds to the steps of the method in the embodiment shown by FIG. 5a. As shown in FIG. 5b, the wind alignment deviation correction algorithm corresponds to steps 501 to 504 described above, i.e., a wind alignment angle deviation of the wind turbine is obtained by respectively acquiring environmental wind speed values, wind alignment angle measurement values (measured by a wind measuring apparatus) and generation power values of the wind turbine. During the calculation process, an operation state of the wind turbine is considered, for example whether the wind turbine operates at a limited power currently or reaches a rated power. Finally, the subsequent wind alignment angle measurement values are corrected by using the obtained wind alignment angle deviation. The corrected wind alignment angle measurement values may be transmitted to a yawing control system of the wind turbine so as to assist completing a yawing control operation for the wind turbine.

Based on the embodiment shown by FIG. 4, with the method for controlling wind alignment correction of the wind turbine in the embodiment, the local maximum values of the generation power values for the respective wind speed sections is acquired by a curve fitting method; and a weighted average value of the wind alignment angle measurement values corresponding to the local maximum values of the generation power values for the respective wind speed sections is calculated to determine the wind alignment correction deviation of the wind turbine, such that the calculation operation process is further standardized and the obtained wind alignment correction deviation is more accurate. In the embodiment, steps to be performed in a case that it is not suitable to further correct the current wind alignment angle measurement values is further described. For example, when the wind turbine operates at a limited power or a current power has reached a rated power, the wind turbine is triggered to stop calculating the wind alignment correction deviation and continuously correct the wind alignment angle measurement values to be acquired subsequently by using the wind alignment correction deviation used currently to maintain the original correction level, such that the possibility that operation of the wind turbine exceeds the limited power or the rated power when the wind alignment angle measurement values are corrected by using newly calculated and more suitable wind alignment correction deviation is reduced.

Third Embodiment

Figure 6:
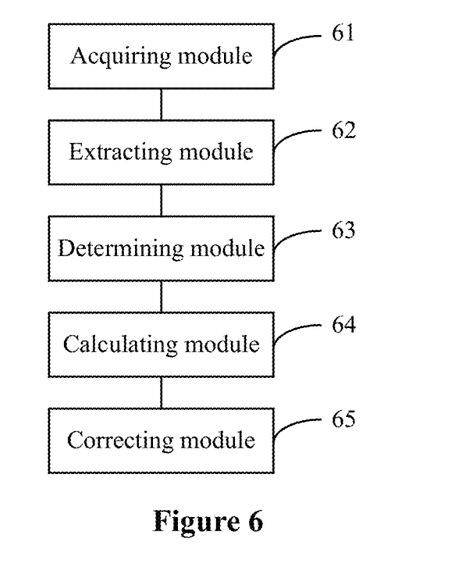
FIG. 6 is a schematic structural diagram of a device for controlling wind alignment correction of a wind turbine according to an embodiment of the present disclosure.

FIG. 6 is a schematic structural diagram of a device for controlling wind alignment correction of a wind turbine according to an embodiment of the present disclosure. The device may be used to perform steps of the method in the embodiment shown by FIG. 4. As shown in FIG. 6, the device for controlling wind alignment correction of the wind turbine includes: an acquiring module 61, an extracting module 62, a determining module 63, a calculating module 64 and a correcting module 65.

The acquiring module 61 is configured to acquire environmental wind speed values, wind alignment angle measurement values and generation power values of the wind turbine in a real-time manner.

The extracting module 62 is configured to group the acquired environmental wind speed values into multiple wind speed sections based on the magnitudes of the environmental wind speed values, and extract wind alignment angle measurement values and generation power values for at least one of the multiple wind speed sections.

The determining module 63 is configured to determine local maximum values of the generation power values extracted for the respective wind speed sections.

The calculating module 64 is configured to calculate a wind alignment correction deviation of the wind turbine based on wind alignment angle measurement values corresponding to the local maximum values of the generation power values extracted for the respective wind speed sections.

The correcting module 65 is configured to correct wind alignment angle measurement values to be acquired subsequently by using the wind alignment correction deviation.

Further, the determining module 63 is configured to perform curve fitting on the generation power values and the wind alignment angle measurement values extracted for each of the respective wind speed sections, and determine a maximum value of the generation power values on each fitted curve as one of the local maximum values of the generation power values for the respective wind speed sections.

Further, the calculating module 64 is configured to calculate a weighted average value of wind alignment angle measurement values corresponding to the local maximum values of the generation power values extracted for the respective wind speed sections, and determine the calculation result as a wind alignment correction deviation of the wind turbine.

The correcting module 65 is configured to determine differences obtained by subtracting the wind alignment correction deviation from the wind alignment angle measurement values to be acquired subsequently as corrected wind alignment angle measurement values.

Figure 7:
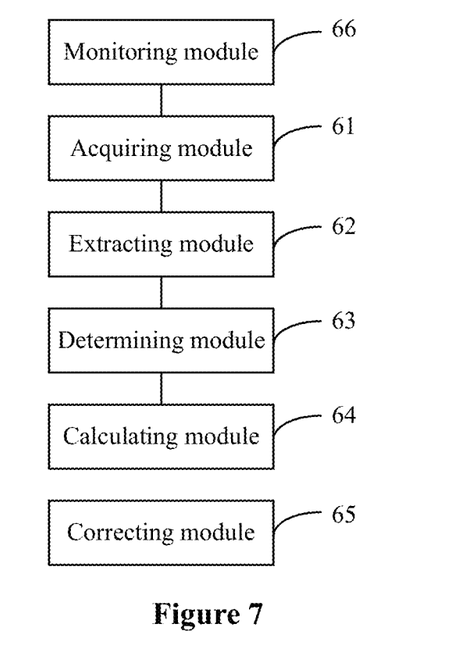
FIG. 7 is a schematic structural diagram of a device for controlling wind alignment correction of a wind turbine according to another embodiment of the present disclosure.

Based on the embodiment shown by FIG. 6, as shown in FIG. 7, the device may further include a monitoring module 66 configured to: during the process of calculating the wind alignment correction deviation of the wind turbine, trigger the wind turbine to stop calculating the wind alignment correction deviation and continuously correct the wind alignment angle measurement values to be acquired subsequently by using the wind alignment correction deviation used currently, if it is monitored that the wind turbine operates at a limited power or a current power has reached a rated power.

The steps of the method in the embodiment shown by FIG. 5a may be performed by the device for controlling wind alignment correction of the wind turbine in the embodiment shown by FIG. 7, and the principle of the method is not described in detail here.

With the device for controlling wind alignment correction of the wind turbine according to the embodiment of the present disclosure, the environmental wind speed values, the wind alignment angle measurement values and the generation power values of the wind turbine are acquired in a real-time manner; the acquired environmental wind speed values are grouped into multiple wind speed sections based on the magnitudes of the environmental wind speed values, and the wind alignment angle measurement values and the generation power values are extracted for at least one wind speed section; local maximum values of the generation power values extracted for the respective wind speed sections are determined; the wind alignment correction deviation of the wind turbine is calculated based on wind alignment angle measurement values corresponding to the local maximum values of the generation power values extracted for the respective wind speed sections; and the wind alignment angle measurement values to be acquired subsequently are corrected by using the wind alignment correction deviation. The device controls wind alignment correction of the wind turbine in operation in a real-time manner as needed, thereby improving correction efficiency.

Further, in the embodiment, the local maximum values of the generation power values for the respective wind speed sections is acquired by a curve fitting method; and a weighted average value of the wind alignment angle measurement values corresponding to the local maximum values of the generation power values for the respective wind speed sections is calculated to determine the wind alignment correction deviation of the wind turbine, such that the calculation operation process is further standardized and the obtained wind alignment correction deviation is more accurate. In addition, in the embodiment, steps to be performed in a case that it is not suitable to further correct the current wind alignment angle measurement values is further described. For example, if the wind turbine operates at a limited power currently or a current power has reached a rated power, the wind turbine is triggered to stop calculating the wind alignment correction deviation and continuously correct the wind alignment angle measurement values to be acquired subsequently by using the wind alignment correction deviation used currently so as to maintain the original correction level, such that the probability that operation of the wind turbine exceeds the limited power or the rated power when the wind alignment angle measurement values are corrected by using newly calculated and more suitable wind alignment correction deviation is reduced.

Figure 8A:
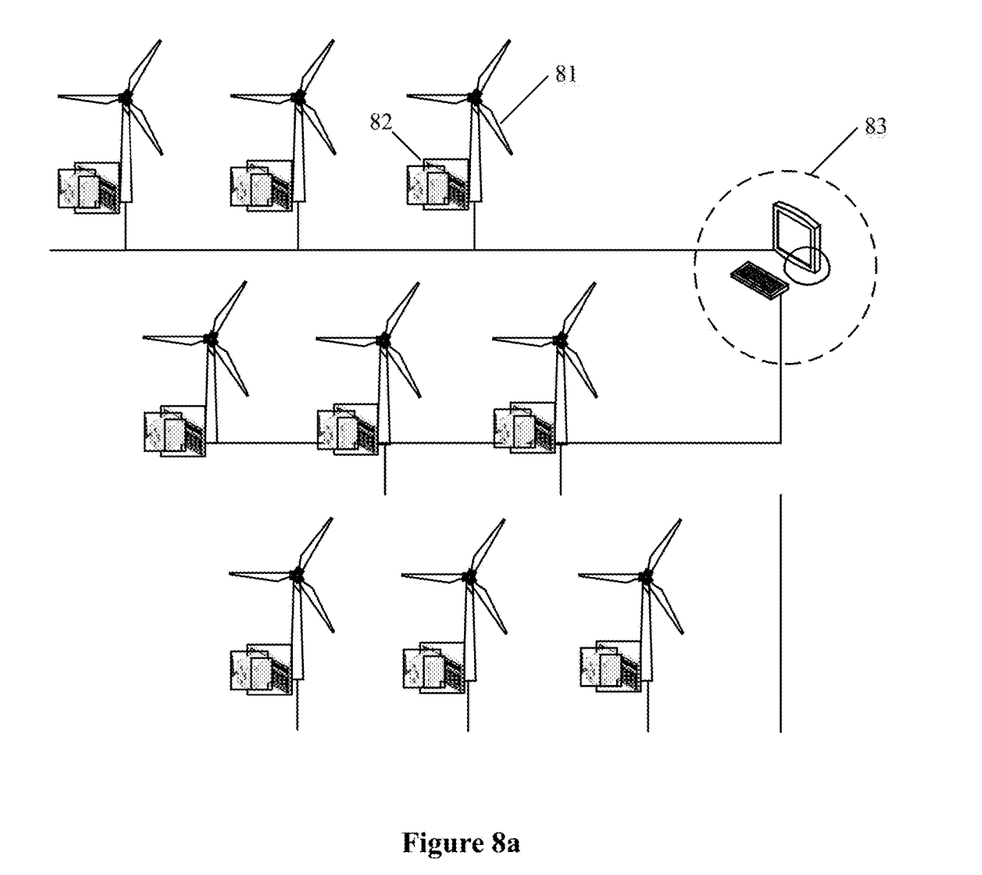
FIG. 8a is a schematic structural diagram of a system for controlling wind alignment correction of wind turbines according to an embodiment of the present disclosure.
Figure 8B:
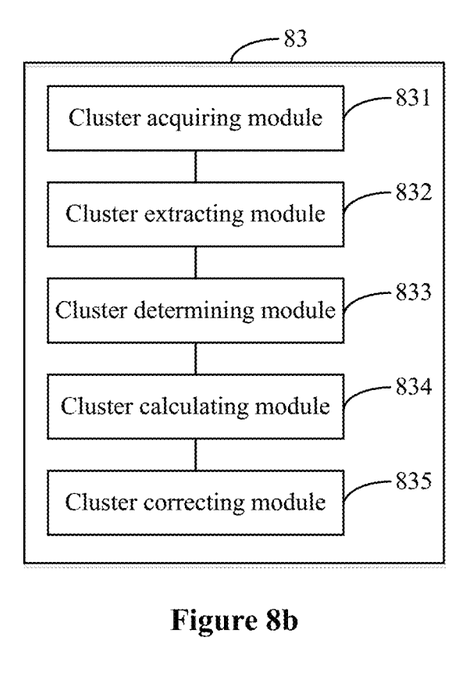
FIG. 8b is a schematic structural diagram of a cluster controller in a system for controlling wind alignment correction of wind turbines according to the present disclosure.

As shown by FIG. 8a and FIG. 8b, a system for controlling wind alignment correction of wind turbines is further provided according to the embodiment, which includes: a cluster controller 83 and stand-alone controllers 82 provided on the wind turbines 81.

Each of the stand-alone controllers 82 is configured to monitor environmental wind speed values, wind alignment angle measurement values and generation power values of the wind turbine 81 where the stand-alone controller 82 is located.

The cluster controller 83 includes:
- a cluster acquiring module 831 configured to acquire environmental wind speed values, wind alignment angle measurement values and generation power values of the wind turbines 81 from the stand-alone controllers 82;
- a cluster extracting module 832 configured to group the acquired environmental wind speed values of each wind turbine 81 into multiple wind speed sections based on the magnitudes of the environmental wind speed values and extract wind alignment angle measurement values and generation power values for at least one of the multiple wind speed sections;
- a cluster determining module 833 is configured to determine local maximum values of the generation power values extracted for the respective wind speed sections of each wind turbine 81;
- a cluster calculating module 834 is configured to calculate a wind alignment correction deviation of each wind turbine 81 based on the wind alignment angle measurement values extracted for the respective wind speed sections of the wind turbine 81 and corresponding to the determined local maximum value of the generation power values; and
- a cluster correcting module 835 is configured to instruct the stand-alone controllers 82 to correct the wind alignment angle measurement values to be monitored subsequently by using the wind alignment correction deviations.

Each stand-alone controller 82 may be a control system provided on a wind turbine 81 to control operation of the wind turbine 81. The cluster controller 83 may be a master control system applied to a whole wind farm and configured to adjust and control all stand-alone controllers 82 in the wind farm.

The steps of the methods in the embodiments shown by FIG. 4 and FIG. 5 may be implemented by the system for controlling wind alignment correction of the wind turbines shown in the embodiment, and the principles of the steps are not described in detail here.

With the system for controlling wind alignment correction of the wind turbines according to the embodiment, wind alignment correction deviations of all wind turbines in a wind farm can be calculated respectively based on personalization data of the wind turbines, and stand-alone controllers in the wind turbines are controlled based on the wind alignment correction deviations to correct the wind alignment angle measurement values to be acquired subsequently, thereby improving group control operability of the wind farm.

Finally, it should be noted that the embodiments described above are only used to illustrate the technical solutions of the present disclosure rather than limit the present disclosure. Although the present disclosure is described in detail with reference to the embodiments described above, those skilled in the art should understand that the technical solutions described in the embodiments may be changed, or a part or all of the technical features may be replaced equivalently. The changes or replacements do not cause the essence of the corresponding technical solutions to depart from the scope of protection of the technical solutions of the embodiments of the present disclosure.

The invention claimed is:

1. A method for controlling wind alignment correction of a wind turbine, comprising:
   acquiring environmental wind speed values, wind alignment angle measurement values and generation power values of the wind turbine in a real-time manner;
   grouping the acquired environmental wind speed values into a plurality of wind speed sections based on magnitudes of the environmental wind speed values, and extracting the wind alignment angle measurement values and the generation power values for at least one of the plurality of wind speed sections;
   determining local maximum values of the generation power values extracted for the respective wind speed sections;
   calculating a wind alignment correction deviation of the wind turbine based on the wind alignment angle measurement values extracted for the respective wind speed sections and corresponding to the determined local maximum values of the generation power values; and
   correcting the wind alignment angle measurement values to be acquired subsequently by using the wind alignment correction deviation.

2. The method according to claim 1, wherein the determining local maximum values of the generation power values extracted for the respective wind speed sections comprises:
   performing curve fitting on the generation power values and the wind alignment angle measurement values extracted for each of the respective wind speed sections, and determining a maximum value of the generation power values on each fitted curve as one of the local maximum values of the generation power values for the respective wind speed sections.

3. The method according to claim 2, wherein the calculating the wind alignment correction deviation of the wind turbine based on the wind alignment angle measurement values extracted for the respective wind speed sections and corresponding to the determined local maximum values of the generation power values comprises:
   calculating a weighted average value of the wind alignment angle measurement values extracted for the respective wind speed sections and corresponding to the local maximum values of the generation power values, and determining the calculation result as the wind alignment correction deviation of the wind turbine.

4. The method according to claim 3, wherein the correcting the wind alignment angle measurement values to be acquired subsequently by using the wind alignment correction deviation comprises:
   determining differences obtained by subtracting the wind alignment correction deviation from the wind alignment angle measurement values to be acquired subsequently as corrected wind alignment angle measurement values.

5. The method according to claim 1, further comprising:
   during calculating the wind alignment correction deviation of the wind turbine, triggering the wind turbine to stop calculating the wind alignment correction deviation and continuously correcting the wind alignment angle measurement values to be acquired subsequently by using the wind alignment correction deviation used currently, if it is monitored that the wind turbine operates at a limited power currently or a current power of the wind turbine has reached a rated power.

6. A device for controlling wind alignment correction of a wind turbine, comprising:
an acquiring module configured to acquire environmental wind speed values, wind alignment angle measurement values and generation power values of the wind turbine in a real-time manner;
an extracting module configured to group the acquired environmental wind speed values into a plurality of wind speed sections based on magnitudes of the environmental wind speed values and extract the wind alignment angle measurement values and the generation power values for at least one of the plurality of wind speed sections;
a determining module configured to determine local maximum values of the generation power values extracted for the respective wind speed sections;
a calculating module configured to calculate a wind alignment correction deviation of the wind turbine based on the wind alignment angle measurement values extracted for the respective wind speed sections and corresponding to the determined local maximum values of the generation power values; and
a correcting module configured to correct the wind alignment angle measurement values to be acquired subsequently by using the wind alignment correction deviation.

7. The device according to claim 6, wherein the determining module is configured to:
perform curve fitting on the generation power values and the wind alignment angle measurement values extracted for each of the respective wind speed sections, and determine a maximum value of the generation power values on each fitted curve as one of the local maximum values of the generation power values for the respective wind speed sections.

8. The device according to claim 7, wherein the calculating module is configured to:
calculate a weighted average value of the wind alignment angle measurement values extracted for the respective wind speed sections and corresponding to the determined local maximum values of the generation power values, and determine the calculation result as the wind alignment correction deviation of the wind turbine.

9. The device according to claim 8, wherein the correcting module is configured to:
determine differences obtained by subtracting the wind alignment correction deviation from the wind alignment angle measurement values to be acquired subsequently as corrected wind alignment angle measurement values.

10. The device according to claim 6, further comprising:
a monitoring module configured to, during calculating the wind alignment correction deviation of the wind turbine, trigger the wind turbine to stop calculating the wind alignment correction deviation and continuously correct the wind alignment angle measurement values to be acquired subsequently by using the wind alignment correction deviation used currently, if it is monitored that the wind turbine operates at a limited power currently or a current power of the wind turbine has reached a rated power.

11. A system for controlling wind alignment correction of wind turbines, comprising a cluster controller and stand-alone controllers provided on the wind turbines, wherein
each of the stand-alone controllers is configured to monitor environmental wind speed values, wind alignment angle measurement values and generation power values of the wind turbine generation system where the stand-alone controller is located, and
the cluster controller comprises:
a cluster acquiring module configured to acquire environmental wind speed values, wind alignment angle measurement values and generation power values of the wind turbines from the stand-alone controllers;
a cluster extracting module configured to group the acquired environmental wind speed values of each of the wind turbines into a plurality of wind speed sections based on magnitudes of the environmental wind speed values, and extract the wind alignment angle measurement values and the generation power values for at least one of the plurality of wind speed sections;
a cluster determining module configured to determine local maximum values of the generation power values extracted for the respective wind speed sections of each wind turbine;
a cluster calculating module configured to calculate a wind alignment correction deviation of each wind turbine based on the wind alignment angle measurement values extracted for the respective wind speed sections of the wind turbine and corresponding to the determined local maximum values of the generation power values; and
a cluster correcting module configured to instruct the stand-alone controllers to correct the wind alignment angle measurement values to be monitored subsequently by using the wind alignment correction deviations.

12. The method according to claim 2, further comprising:
during calculating the wind alignment correction deviation of the wind turbine, triggering the wind turbine to stop calculating the wind alignment correction deviation and continuously correcting the wind alignment angle measurement values to be acquired subsequently by using the wind alignment correction deviation used currently, if it is monitored that the wind turbine operates at a limited power currently or a current power of the wind turbine has reached a rated power.

13. The method according to claim 3, further comprising:
during calculating the wind alignment correction deviation of the wind turbine, triggering the wind turbine to stop calculating the wind alignment correction deviation and continuously correcting the wind alignment angle measurement values to be acquired subsequently by using the wind alignment correction deviation used currently, if it is monitored that the wind turbine operates at a limited power currently or a current power of the wind turbine has reached a rated power.

14. The method according to claim 4, further comprising:
during calculating the wind alignment correction deviation of the wind turbine, triggering the wind turbine to stop calculating the wind alignment correction deviation and continuously correcting the wind alignment angle measurement values to be acquired subsequently by using the wind alignment correction deviation used currently, if it is monitored that the wind turbine operates at a limited power currently or a current power of the wind turbine has reached a rated power.

15. The device according to claim 7, further comprising:
a monitoring module configured to, during calculating the wind alignment correction deviation of the wind turbine, trigger the wind turbine to stop calculating the wind alignment correction deviation and continuously correct the wind alignment angle measurement values to be acquired subsequently by using the wind alignment correction deviation used currently, if it is monitored that the wind turbine operates at a limited power currently or a current power of the wind turbine has reached a rated power.

16. The device according to claim 8, further comprising:
a monitoring module configured to, during calculating the wind alignment correction deviation of the wind turbine, trigger the wind turbine to stop calculating the wind alignment correction deviation and continuously correct the wind alignment angle measurement values to be acquired subsequently by using the wind alignment correction deviation used currently, if it is monitored that the wind turbine operates at a limited power currently or a current power of the wind turbine has reached a rated power.

17. The device according to claim 9, further comprising:
a monitoring module configured to, during calculating the wind alignment correction deviation of the wind turbine, trigger the wind turbine to stop calculating the wind alignment correction deviation and continuously correct the wind alignment angle measurement values to be acquired subsequently by using the wind alignment correction deviation used currently, if it is monitored that the wind turbine operates at a limited power currently or a current power of the wind turbine has reached a rated power.

* * * * *